United States Patent
Kalwa et al.

(10) Patent No.: US 11,072,087 B2
(45) Date of Patent: Jul. 27, 2021

(54) WOODEN MATERIAL PANEL, IN PARTICULAR IN THE FORM OF A WOOD-PLASTIC COMPOSITE MATERIAL, AND A METHOD FOR PRODUCING THE SAME

(71) Applicant: Flooring Technologies Ltd., Kalkara (MT)

(72) Inventors: Norbert Kalwa, Horn-Bad Meinberg (DE); Jens Siems, Malchin (DE); Ingo Lehnhoff, Dierhagen (DE)

(73) Assignee: Flooring Technologies Ltd., Kalkara (MT)

( * ) Notice: Subject to any disclaimer, the term of this patent is extended or adjusted under 35 U.S.C. 154(b) by 0 days.

(21) Appl. No.: 16/452,031

(22) Filed: Jun. 25, 2019

(65) Prior Publication Data

US 2019/0315015 A1    Oct. 17, 2019

Related U.S. Application Data

(63) Continuation of application No. 15/524,457, filed as application No. PCT/EP2015/060622 on May 13, 2015, now Pat. No. 10,369,721.

(30) Foreign Application Priority Data

Nov. 6, 2014 (EP) .................................... 14191988
Dec. 18, 2014 (EP) .................................... 14198757
Jan. 29, 2015 (EP) .................................... 15153005

(51) Int. Cl.
*B27N 3/04* (2006.01)
*B27N 3/00* (2006.01)
(Continued)

(52) U.S. Cl.
CPC ................. *B27N 3/04* (2013.01); *B27N 1/02* (2013.01); *B27N 3/002* (2013.01); *B27N 3/02* (2013.01);
(Continued)

(58) Field of Classification Search
None
See application file for complete search history.

(56) References Cited

U.S. PATENT DOCUMENTS

| | | |
|---|---|---|
| 3,718,536 A | 2/1973 | Downs et al. |
| 4,193,830 A | 3/1980 | Milne |

(Continued)

FOREIGN PATENT DOCUMENTS

| | | |
|---|---|---|
| CN | 1648158 A | 8/2005 |
| CN | 1837278 A | 9/2006 |

(Continued)

OTHER PUBLICATIONS

Ukai, M et al., Wood Molding and Its Manufacturing Method, Sep. 11, 2001, machine translation of JP2001-246606 (Year: 2001).*

(Continued)

*Primary Examiner* — Chinessa T. Golden
(74) *Attorney, Agent, or Firm* — The Webb Law Firm

(57) ABSTRACT

The present invention relates to a wooden material panel, in particular a wood-plastic composite material, including particles of wood and at least one plastic that is functionalized with at least one organic compound. At least one decorative layer is provided on at least one side of the wooden material panel.

18 Claims, 2 Drawing Sheets

(51) Int. Cl.
  *B27N 3/02* (2006.01)
  *B27N 3/18* (2006.01)
  *B27N 3/24* (2006.01)
  *B27N 7/00* (2006.01)
  *B27N 3/06* (2006.01)
  *B27N 1/02* (2006.01)
  *B27N 1/00* (2006.01)

(52) U.S. Cl.
  CPC .............. *B27N 3/06* (2013.01); *B27N 3/18* (2013.01); *B27N 3/24* (2013.01); *B27N 7/005* (2013.01); *B27N 1/00* (2013.01); *B27N 7/00* (2013.01)

(56) References Cited

U.S. PATENT DOCUMENTS

| | | | |
|---|---|---|---|
| 4,430,375 | A | 2/1984 | Scher et al. |
| 4,734,236 | A | 3/1988 | Davis |
| 4,744,854 | A | 5/1988 | Schenz |
| 5,187,000 | A | 2/1993 | Chow et al. |
| 2002/0136862 | A1* | 9/2002 | Dong ............... B32B 21/08 428/150 |
| 2002/0168503 | A1 | 11/2002 | Dong et al. |
| 2004/0028958 | A1 | 2/2004 | Assink et al. |
| 2005/0238865 | A1 | 10/2005 | Konishi |
| 2006/0032175 | A1* | 2/2006 | Chen ............... B32B 3/06 52/578 |
| 2006/0143869 | A1 | 7/2006 | Pohlmann |
| 2007/0042664 | A1 | 2/2007 | Thompson et al. |
| 2008/0029926 | A1 | 2/2008 | Steinwender et al. |
| 2010/0055420 | A1 | 3/2010 | Vermeulen |
| 2010/0300030 | A1 | 12/2010 | Pervan et al. |
| 2010/0307675 | A1* | 12/2010 | Buhlmann ............... B44C 5/043 156/272.2 |
| 2011/0089611 | A1 | 4/2011 | Hoffman et al. |
| 2011/0291316 | A1 | 12/2011 | Lempfer |
| 2012/0172494 | A1 | 7/2012 | Warnes et al. |
| 2014/0147641 | A1 | 5/2014 | Vermeulen |
| 2015/0030817 | A1 | 1/2015 | Wiegelmann et al. |
| 2015/0368909 | A1 | 12/2015 | Hannig |
| 2016/0222658 | A1 | 8/2016 | Hecht et al. |

FOREIGN PATENT DOCUMENTS

| | | |
|---|---|---|
| CN | 101243222 A | 8/2008 |
| CN | 101537652 A | 9/2009 |
| CN | 101687386 A | 3/2010 |
| CN | 102120334 A | 7/2011 |
| CN | 102470544 A | 5/2012 |
| CN | 102975272 A | 3/2013 |
| CN | 103153608 A | 6/2013 |
| DE | 4030774 A1 | 4/1992 |
| DE | 20023167 U1 | 7/2003 |
| DE | 102008039720 A1 | 3/2010 |
| DE | 102010036454 A1 | 1/2012 |
| DE | 102011121865 A1 | 6/2013 |
| EP | 0195128 A1 | 9/1986 |
| EP | 1716995 A2 | 11/2006 |
| EP | 1664193 B1 | 2/2007 |
| EP | 1769894 A2 | 4/2007 |
| EP | 2027979 A1 | 2/2009 |
| EP | 2030786 A2 | 3/2009 |
| EP | 1674224 B1 | 3/2011 |
| EP | 2537653 A1 | 12/2012 |
| EP | 2762328 A1 | 8/2014 |
| EP | 2772352 A1 | 9/2014 |
| EP | 2808463 A1 | 12/2014 |
| GB | 1377888 | 12/1974 |
| GB | 1590487 | 6/1981 |
| JP | 671723 B2 | 9/1994 |
| JP | 2001246606 A * | 9/2001 |
| JP | 2001246606 A | 9/2001 |
| JP | 3500403 B2 | 2/2004 |
| JP | 2008057154 A | 3/2008 |
| JP | 4132551 B2 | 8/2008 |
| JP | 2010280186 A | 12/2010 |
| JP | 2010280186 A * | 12/2010 |
| JP | 5481066 B2 | 4/2014 |
| WO | 02060702 A2 | 8/2002 |
| WO | 2006001717 A1 | 1/2006 |
| WO | 2009135883 A1 | 11/2009 |
| WO | 2014111192 A1 | 7/2014 |

OTHER PUBLICATIONS

Ueda, Y, Manufacturing Method for Fiber Board, Dec. 16, 2010, machine translation of JP2010-280186 (Year: 2010).*
Hamilton Manufacturing Inc., "Home Owners Guide to Cellulose Insulation", 2 pgs.
Nu Wool, "Protect Your Home and the Environment, Install Nu Wool Premium Cellulose Insulation", 8 pgs.
Certified copy of priority document EP 14191988.6, Nov. 6, 2014.
Certified copy of priority document EP 15153005.2, Jan. 29, 2015.

* cited by examiner

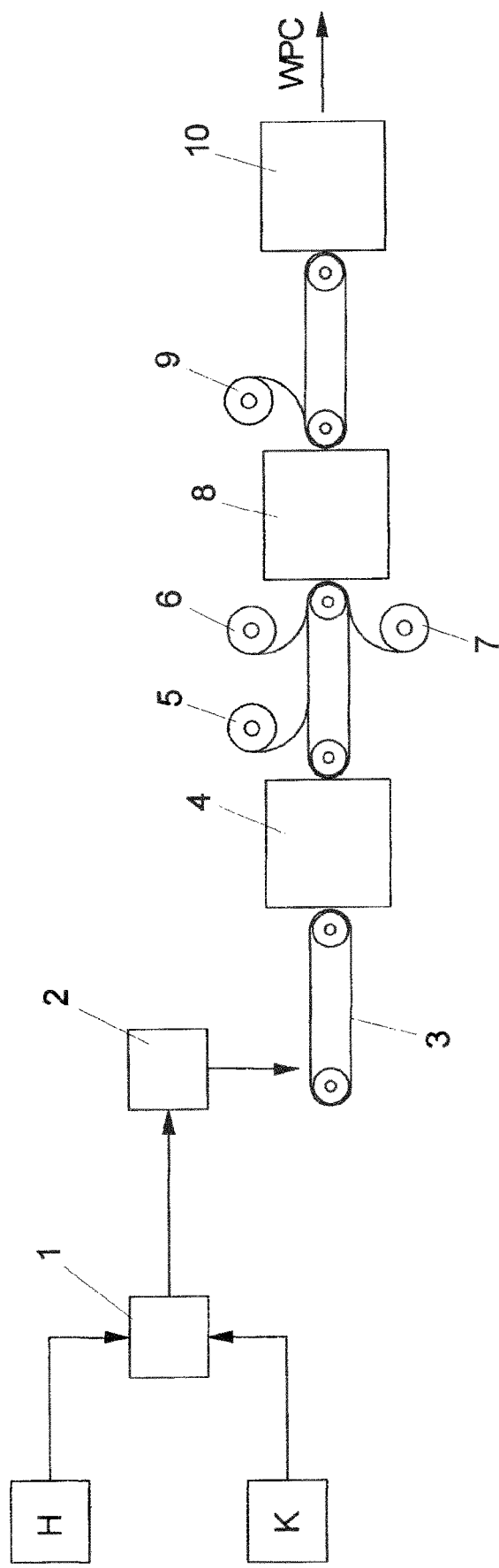

WOODEN MATERIAL PANEL, IN PARTICULAR IN THE FORM OF A WOOD-PLASTIC COMPOSITE MATERIAL, AND A METHOD FOR PRODUCING THE SAME

CROSS-REFERENCE TO RELATED APPLICATIONS

This application is a continuation of U.S. patent application Ser. No. 15/524,457, filed May 4, 2017, which is the United States national phase of International Application No. PCT/EP2015/060622 filed May 13, 2015, and claims priority to European Patent Application No. 14191988.6 filed Nov. 6, 2014, European Patent Application No. 14198757.8 filed Dec. 18, 2014, and European Patent Application No. 15153005.2 filed Jan. 29, 2015, the disclosures of which are hereby incorporated in their entirety by reference.

BACKGROUND OF THE INVENTION

Field of the Invention

The present invention relates to a wood-based material board, especially in the form of a wood/plastic composite material, and to a process for producing such a wood-based material board.

Description of Related Art

In a multitude of floor coverings, a fundamental problem in use is the material damage caused by moisture and/or water, said material damage including not just material destruction but also deterioration in the product properties or the occurrence of odors. Whereas the occurrence of watermarks, odors or, in the worst case, mold is observable in the case of textile floor coverings as a result of these specific conditions, it is usually surface impairments such as mattness that are observable in the case of varnished products.

As well as textile floor coverings, the use of wood-based material boards, for example in the form of wood fiberboards in different configurations, for use as a floor laminate or for cladding of walls or else in the production of furniture has long been known. For example, wood fiberboards are used in the form of medium-density wood fiberboards (MDF boards), high-density wood fiberboards (HDF boards), particleboards or OSBs (oriented strand boards), which are obtained by compression of appropriate wood fibers or shavings with a thermoset polymer resin as binder.

A particular problem in the use of the wood fiberboards mentioned lies in the sensitivity of the wood fibers or wood shavings used to high air moisture contents and direct contact with water. Whereas this problem can be controlled relatively easily by means of construction or technological measures in the case of furniture or products for interior fitting, this is frequently much more problematic in the case of floor coverings, for example laminate floors based on wood or wood-based materials.

Floor coverings based on wood or wood-based material boards, such as laminate floors or ready-made parquet, react quickly to contact with water by swelling and/or changes in dimensions which can evolve from slight edge swelling as far as destruction of the fitting structure. One cause of this is exposure to water-based care products, which are in some cases used very frequently and very intensively. High air humidities can also trigger comparable processes. Furthermore, the floor covering is typically also in direct contact with the components of the building, for example concrete floors/screed or walls, which can likewise transport moisture into the floor covering. For this reason, in the production of the abovementioned wood-based material products, low-swelling woods or wood-based materials are employed, which can alleviate the problems described, but not entirely remedy them. In some cases, inorganic base boards are also used for production of products having wood surfaces, but there can be problems here with bonding, processing or laying.

The more densely the wood or wood-based material has been consolidated in the production of the product, the more serious the moisture damage. As a result, the swelling pressure on contact with water is greatly increased. This explains, for example, the distinct reaction of laminate floors or varnished wood-based materials to direct contact with water. A multitude of measures (swell-tempered boards, edge sealing, etc.) has led to improvements with regard to sensitivity to water/moisture, but has not been able to completely solve the problems.

As an alternative to the use of laminate floors with the swelling problem mentioned, there was increasing use in the past of floor coverings based on polyvinyl chloride (PVC), which have very low to zero swelling. However, disadvantages of the use of PVC floors are their high sensitivity to scratching and their tendency to creep, which leads to rapid wear and an unsightly appearance of the floor covering especially in areas with high traffic (for example sales areas).

For these reasons, wood/plastic composites (WPCs) have frequently been used in the past as backing materials for wood products. These backing materials have very low swelling of less than 3% and high dimensional stability.

WPCs are thermoplastically processible composite materials based on wood flour or wood shavings and thermoplastic polymers, to which further additives may be added if appropriate. The mixtures of wood fibers and thermoplastics are melted and processed to agglomerates. Later in the production process, the agglomerates are melted in extruders and processed to give boards of relatively small size format. The width of the boards here is usually within a range of less than 1 meter, caused by the production process in an extruder. The productivity per hour is also in a low single-digit square meter range, and so the combination of low productivity and limited board size causes relatively high costs of the WPC boards thus produced.

The fact that the wood component has to be dried to a moisture content of less than 5 wt %, better even to less than 1 wt %, likewise does not contribute to low costs. Higher moisture contents lead to formation of water vapor in the process and hence to blister formation in the product. A further serious disadvantage is that the wood used has to be free of sand and minerals. Such disruptive materials would otherwise destroy the extrusion tool.

This correspondingly gives rise to the disadvantages of low productivity, limited board size and hence a costly process.

SUMMARY OF THE INVENTION

It is therefore a technical object of the present invention to remedy the disadvantages described and to provide wood-based material boards having a low swelling of, for example, less than 3% in more variable and larger size formats and with higher productivity. These wood-based material boards are subsequently to be usable as base boards, including for production of products for applications with elevated occurrence of moisture.

This object is achieved by a wood-based material board and a process for producing this wood-based material board.

Accordingly, a wood-based material board, especially in the form of a wood/polymer composite material, is provided, comprising wood particles and at least one polymer, wherein the at least one polymer has preferably been functionalized with at least one organic compound. The at least one organic compound preferably has at least one functional group which is especially capable of forming a bond with the OH groups of the wood fibers.

The present wood-based material board additionally has at least one decorative layer which has been applied on at least one side, preferably the top side, of the board.

The wood-based material board is produced in a process comprising the following steps:
  applying a mixture of wood particles and polymer, especially a polymer functionalized with at least one organic compound, to a first transport belt to form a preliminary mat and introducing the preliminary mat into at least one first heat treatment oven for pre-consolidation;
  transferring the pre-consolidated mat into at least one double belt press for further consolidation to a wood-based material board; and
  chilling the consolidated wood-based material board in at least one chill press.

The present wood-based material board is produced in a multistage process, especially in a three-stage process, in which, firstly, a mixture of wood particles, for example in the form of wood fibers, and functionalized polymers, especially thermoplastic polymers, is used to produce a pre-consolidated mat or damping material mat having a low apparent density. This mat or damping material mat having a low apparent density is subsequently first consolidated in a double belt press under high pressure and at high temperature and then chilled in a chill press. The present process enables the production of wood-based material boards in the form of wood/polymer composite materials or composites (WPCs) in large size formats which serve as base boards for production of floor coverings, associated with high productivity and hence lower costs.

In one embodiment, a thermoplastic polymer, especially in the form of pellets, powder or polymer fibers, is used in the wood particle/polymer mixture.

The thermoplastic polymer is preferably selected from a group comprising polyethylene (PE), polypropylene (PP), polyesters, polyethylene terephthalate (PET), polyamide (PA), polystyrene (PS), acrylonitrile-butadiene-styrene (ABS), polymethylmethacrylate (PMMA), polycarbonate (PC), polyether ether ketone (PEEK), polyisobutylene (PIB), polybutylene (PB), mixtures and copolymers thereof. It is especially preferable when the thermoplastic polymer used is PE, PP or a mixture thereof.

As mentioned above, the thermoplastic polymer can be used in the form of polymer fibers. The polymer fibers may take the form of monocomponent fibers or of bicomponent fibers. The thermally activatable polymer fibers or binder fibers exert both a binding function and a support function in the matrix of wood fibers or wood particles. If monocomponent fibers are used, these preferably consist of polyethylene or other thermoplastic polymers having a low melting point.

Bicomponent fibers (also referred to as bicomponent support fibers) are used with particular preference. Bicomponent fibers increase the stiffness of wood fiberboards and also reduce the tendency to creep which is encountered in the case of thermoplastic polymers (for example in the case of PVC).

The bicomponent fibers typically consist of a support filament or else a core fiber composed of a polymer having relatively high thermal stability, especially polyester or propylene, encased or ensheathed by a polymer having a lower melting point, especially composed of polyethylene. The shell or the sheath of the bicomponent fibers enables crosslinking of the wood particles with one another after (partial) melting. In the present case, the bicomponent fibers used are especially those based on thermoplastics such as PP/PE, polyester/PE or polyester/polyester.

It is likewise conceivable that the polymer component itself is also a mixture of different polymers. For instance, a polymer mixture may consist of 20 wt % bicomponent fibers:80 wt % PE fibers up to 80 wt % bicomponent fibers:20 wt % PE fibers. In general, other compositions are also possible. Through the change in the composition of the polymer component, it is possible to alter and adjust the temperature required for consolidation of the preliminary mat or mat.

As stated above, in the present case, at least one polymer functionalized with at least one organic compound is used. The organic compound, for example in the form of a monomer, has in turn preferably been provided with at least one functional group, the functional group being capable of entering into at least one bond, especially a chemical bond, with the OH groups of the cellulose of the wood particles. This gives rise to a chemical bond between the polymer, especially the polymer fibers, and the wood fibers, which prevents separation between the two fiber types on contact with water.

The compound is an organic compound wherein at least one functional group is selected from a group comprising —$CO_2H$, —$CONH_2$, —COO—, especially maleic acid, phthalic acid, succinic acid, glutaric acid, adipic acid or the anhydrides thereof, or succinimide.

The monomeric organic compound, for example maleic anhydride (MA), is grafted onto the nonpolar base polymer, for example polypropylene or polyethylene, in a grafting method. In this case, it is also possible that the organic compound comprises more than one monomer, for example in the form of a dimer or trimer, in which case, for example, two functionalized organic molecules or compounds in each case are joined to one another via a bridge molecule, for example in the form of a non-functionalized molecule. In this connection, particular preference is given to a trimer composed of MA-styrene-MA.

The degree of grafting of the polymer used may be between 0.1 and 5 wt % of monomeric organic compound, preferably between 0.5 and 3 wt %, especially preferably between 1 and 2 wt %.

Most preferably, a mixture of polypropylene and polyethylene, especially in the form of bicomponent fibers consisting of a polypropylene core and a polyethylene shell, is used, the nonpolar base polymers having been functionalized with maleic anhydride in each case. It is also possible for the bicomponent fibers to consist of polyethylene terephthalate/polyethylene terephthalate-co-isophthalate, optionally grafted with MA.

It is also possible to use a mixture of a proportion of non-modified bicomponent fibers (i.e. not grafted with organic compound) and a proportion of polymer functionalized with organic compound (i.e. grafted with organic compound). For instance, it is conceivable to use a mixture of a proportion of polyethylene tere-phthalate/polyethylene terephthalate-co-isophthalate fibers and maleic anhydride-grafted polyethylene (for example in the form of LLDPE fibers).

In a further embodiment of the present process, a wood particle/polymer mixture is used, comprising a mixing ratio of wood particles to plastic (modified and unmodified) between 90 wt % of wood particles:10 wt % of plastics and 20 wt % of wood particles:80 wt % of plastics, preferably between 70 wt % of wood particles:30 wt % of plastics and 40 wt % of wood particles:60 wt % of plastics. The wood particle/polymer mixture used may, by way of example, have 44 wt % of wood fibers or wood particles and 56 wt % of bicomponent fibers, for example polyethylene terephthalate/polyethylene terephthalate-co-isophthalate fibers or PP/PE fibers. A mixing ratio of wood fibers and polymer fibers of 50 wt % to 50 wt % is very particularly preferred.

The wood particles used in the present context are understood to mean lignocellulosic comminution products, for example wood fibers, wood shavings or else wood flour. In the case of use of wood fibers, especially dry wood fibers having a length of 1.0 mm to 20 mm, preferably 1.5 mm to 10 mm, and a thickness of 0.05 mm to 1 mm are used. The wood fiber moisture content of the fibers used is within a range between 5% and 15%, preferably 6% and 12%, based on the total weight of the wood fibers.

It is likewise possible to determine the wood particles used in relation to the mean particle diameter, where the median particle diameter d50 may be between 0.05 mm and 1 mm, preferably 0.1 and 0.8 mm.

In accordance with the desired composition of the wood particle/polymer mixture, the individual components (wood particles and polymer) are intimately mixed in a mixer. The components can be mixed, for example, by introduction into a blow line. Intensive mixing is effected here on the route from the addition of the components to the reservoir vessel by virtue of the air blown in as transport medium. The intensive mixing of the components is continued in the reservoir vessel by the transport air blown in.

From the reservoir vessel, the wood particle/polymer mixture, for example after weighing on a surface balance, are blown onto a first transport belt, homogeneously over its width. The amount of wood particle/polymer mixture supplied is guided by the desired layer thickness and desired apparent density of the preliminary mat to be produced. Typical basis weights of the scattered preliminary mat may be within a range between 3000 and 10 000 $g/m^2$, preferably between 5000 and 7000 $g/m^2$. As already mentioned, the width of the scattered preliminary mat is determined by the width of the first transport belt and may, for example, be within a range up to 3000 mm, preferably 2800 mm, especially preferably up to 2500 mm.

After the application of the wood particle/polymer mixture to a first transport belt to form a preliminary mat, the preliminary mat is introduced into at least one first heat treatment oven for preliminary consolidation. In a particularly preferred embodiment of the process, the preliminary mat composed of wood particles and polymer is heated in the at least one heat treatment oven to a temperature corresponding to or above the melting temperature of the polymer used.

The temperatures in the heat treatment oven may be between 150 and 250° C., preferably 160 and 230° C., especially preferably 160 and 200° C. The core temperature of the preliminary mat is preferably within a range between 100 and 150° C., especially preferably about 130° C. During the heating in the heat treatment oven, there is partial melting of the polymer material, which causes an intimate bond between the polymer material, for example the polymer fibers, with the wood fibers, with simultaneous consolidation of the preliminary mat. The higher the core temperature of the preliminary mat, the faster the press can be run, since the consolidation process is accelerated.

The temperatures in the heat treatment oven are maintained, for example, by blowing in hot air.

In a further embodiment of the present process, the pre-consolidated preliminary mat, after exiting from the heat treatment oven, has an apparent density between 40 and 200 $kg/m^3$, preferably between 60 and 150 $kg/m^3$, especially preferably between 80 and 120 $kg/m^3$. The thickness of the pre-consolidated preliminary mat may be between 20 and 100 mm, preferably 30 and 50 mm, especially preferably 35 and 45 mm.

It is especially preferable when the advance rate of the conveyor belt or transport belt in the heat treatment oven is within a range between 5 and 15 m/min, preferably between 6 and 12 m/min.

After leaving the heat treatment oven, the pre-consolidated preliminary mat can be chilled and processed. Typical processing measures are, for example, the trimming of the preliminary mat.

The waste obtained here, especially the edge strips obtained, can be comminuted and recycled into the process. Since the mixing ratio is as desired, the material can be fed directly into the reservoir vessel.

In a further variant of the present process, the pre-consolidated preliminary mat is consolidated in the at least one double belt press to a thickness between 2 and 20 mm, preferably 3 and 15 mm, especially preferably 4 and 10 mm.

The temperature applied during the consolidation of the preliminary mat in the at least one double belt press is between 150 and 250° C., preferably 180 and 230° C., preferably 200 and 220° C. The pressure applied in the at least one double belt press may be between 2 MPa and 10 MPa, preferably 3 MPa and 8 MPa, especially preferably 5 and 7 MPa. The advance rate of the double belt press is between 4 and 15 m/min, preferably between 6 and 12 m/min.

After leaving the at least one double belt press, the consolidated wood-based material board is introduced into at least one chill press in which the consolidated wood-based material board is chilled to temperatures between 10 and 100° C., preferably 15 and 70° C., especially preferably 20 and 40° C. The pressure applied in the at least one chill press is identical or at least almost identical to the pressure in the double belt press, i.e. the pressure in the chill press is between 2 MPa and 10 MPa, preferably 3 MPa and 8 MPa, especially preferably 5 and 7 MPa.

The introduction of the consolidated wood-based material board into a chill press is necessary since the reset forces of the fibers can be so great that the board would come apart again without the step of chill-pressing after the consolidation in the double belt press.

After leaving the chill press, the consolidated wood-based material boards have a thickness between 2 and 15 mm, preferably 3 and 12 mm, especially preferably 4 and 10 mm.

The apparent density of the consolidated wood-based material boards after leading the chill press is within a range between 500 and 1500 $kg/m^3$, preferably between 650 and 1300 $kg/m^3$, especially preferably between 800 and 1100 $kg/m^3$.

For production of a wood-based material board having an apparent density of 850 $kg/m^3$, for example, a pressure in the double belt press (and also chill press) of 4.5 to 5 MPa (45-50 bar) is advantageously applied at a press temperature in the double belt press intake of 235° C. and a press temperature on the surface of the board of 220° C. In the case of the production of a wood-based material board having an apparent density of 950 kg/m³, a pressure in the double belt press (and also chill press) of 5.5 to 6 MPa (55-60 bar) is advantageously applied at a press temperature in the double belt press intake of 235° C. and a press temperature on the surface of the board of 220° C.

In a particularly preferred embodiment, the process for producing the present wood-based material board comprises the following steps:
- providing wood fibers and polymer fibers, especially of a polymer functionalized with at least one organic compound;
- forming a mixture of the wood fibers and the polymer fibers in a blow line;
- intermediately buffering or intermediately storing the mixture in a feeder;
- blowing the mixture onto a first roll to form a first preliminary mat (airlay);
- defibrating the first preliminary mat and once again blowing the mixture onto a second roll to form a second preliminary mat (airlay);
- transferring the second preliminary mat onto a transport belt and introducing the second preliminary mat into the at least one heat treatment oven for preliminary consolidation by thermal bonding to give a mat;
- transferring the pre-consolidated mat into the at least one double belt press for further consolidation to give a base board, and
- chilling the base board, especially in a chill zone of the at least one press.

The wood fibers and polymer fibers are typically provided in the form of bales which are opened in appropriate bale openers. After the respective bale openers, the fibers are weighed in separate weighing units and introduced into the blow line, in which, on the route from the addition of the fibers and any further components to the reservoir vessel or feeder, there is intensive mixing by the air blown in as transport medium. From the reservoir vessel or feeder, the mixture of wood fibers and polymer fibers, after being weighed on a surface balance, is blown onto a first transport belt with a first roll, homogeneously over its width, to form a first preliminary mat. The first preliminary mat runs into a defibrating apparatus at the end of the first transport belt. The defibrated mixture is blown onto a second transport belt with a second roll to form a second preliminary mat.

The preliminary mat thus obtained (the second preliminary mat here) is now introduced into the heat treatment oven already described above for preliminary consolidation to form the pre-consolidated preliminary mat, which is subsequently transferred into the at least one double belt press for further consolidation to give a wood-based material board.

The wood-based material boards or wood/plastic composites (WPC) produced by the present process are characterized by a swelling of less than 5%, preferably less than 3%, especially preferably less than 1%.

In a further embodiment of the present process, it has been found to be advantageous to add further substances such as fillers or additives, which impart specific properties to the wood-based material board, to the wood particle/polymer mixture prior to the consolidation.

Suitable additives which may be added to the wood particle/polymer mixture include flame retardants, or luminescent or antibacterial substances. Suitable flame retardants may be selected from the group comprising phosphates, borates, especially ammonium polyphosphate, tris(tribromoneopentyl) phosphate, zinc borate or boric acid complexes of polyhydric alcohols.

Further additives may affect the UV stability, the aging characteristics or the electrical conductivity of the wood-based material board. An example of a known method of increasing the UV stability is to add what are called UV-stabilizing compounds such as those known as HALS compounds to polymers. Antifungicides and antibacterial agents used may include polyimines.

It is also advantageous to add an inorganic filler to the wood particle/polymer mixture. Inorganic fillers used may, for example, be materials such as talc, chalk, titanium dioxide or others which impart a specific color to the board.

As explained above, the present wood-based material board has been provided with at least one decorative layer on at least one side, preferably the top side.

The at least one decorative layer may be executed or constructed in various ways.

For instance, the wood-based material board, in a first embodiment, may have a decorative layer comprising at least one decorative film. Such a decorative film consists of at least one thermoplastic carrier layer, of at least one decoration printed onto the carrier layer or of at least one separate decorative layer and at least one polymer seal.

As mentioned, decorative films typically consist of one or more plies of a thermoplastic material as carrier layer, especially polyethylene, polypropylene or polyurethane. The decoration may be printed directly onto this carrier layer or be provided as a separate decorative layer on the carrier layer. The decoration is in turn provided with a polymer seal, for example in the form of a polypropylene film or polyurethane film or in the form of a separate varnish (EBC varnish), in which case the polymer seal may be provided in the form of an antiwear layer with the appropriate wear-inhibiting particles (in this regard, see also below). The decorative films are therefore a ply aggregate composed of carrier layer, decoration and seal, which themselves constitute a finished laminate or a finished composite usable as decorative layer.

Such a decorative film can preferably be laminated onto the wood-based material board using at least one adhesive, or can be pressed onto said board during the process for producing the wood-based material board, especially during the consolidation of the wood fiber mat to the wood-based material board.

In a further embodiment, the wood-based material board may have a decorative layer in the form of a decorative finish film. A decorative finish film consists of an amino resin-filled decorative paper and at least one varnish layer applied thereto. The decorative paper has either been glued or lightly impregnated with the appropriate amino resin (e.g. melamine-formaldehyde resin or urea-formaldehyde resin).

The finish film is preferably laminated onto the wood-based material board using at least one adhesive.

After being laminated onto the wood-based material board, the decorative finish film can be provided with at least one further varnish layer, preferably two or three varnish layers, of a UV-curable and/or electron beam-curable (EBC) varnish.

UV-curable and/or electron beam-curable (EBC) varnishes are especially radiation-curable, acrylate-containing varnishes.

Typically, the radiation-curable varnishes used comprise methacrylates, for example polyester (meth)acrylates, polyether (meth)acrylates, epoxy (meth)acrylates or urethane (meth)acrylates. It is also conceivable that the acrylate used or the acrylate-containing varnish comprises substituted or unsubstituted monomers, oligomers and/or polymers, especially in the form of acrylic acid, acrylic ethers and/or acrylic ester monomers, oligomers or polymers.

The UV-curable varnish and/or electron beam-curable (EBC) varnish may comprise abrasion-resistant particles, natural and/or synthetic fibers and also further additives. The abrasion-resistant or wear-inhibiting particles present in the UV varnish are especially selected from the group comprising aluminas (e.g. corundum), boron carbide, silicon dioxides (e.g. glass beads), silicon carbides.

It is also possible to add natural or synthetic fibers selected from the group comprising wood fibers, cellulose fibers, partially bleached cellulose fibers, wool fibers, hemp fibers and organic or inorganic polymer fibers to the UV and/or EBC varnish. Further additives added may be flame retardants and/or luminescent substances. Suitable flame retardants may be selected from the group comprising phosphates, borates, especially ammonium polyphosphate, tris(tribromoneopentyl) phosphate, zinc borate or boric acid complexes of polyhydric alcohols. Luminescent substances used may be fluorescent or phosphorescent substances, especially zinc sulfite and alkali metal aluminates.

In one embodiment, preference is given to providing more than one radiation-curable protective layer, preferably two or three protective or wear layers, which are each arranged or applied one on top of another. For example, it is possible first to apply a first coat of a UV-curable varnish, followed by a second coat of an EBC varnish, followed in turn by a third coat of an EBC topcoat. The individual varnish layers may each comprise abrasion-resistant and/or nanoparticles, it being especially desirable for the UV varnish to comprise wear-inhibiting particles (for example corundum) and for the EBC topcoat to comprise particles for enhancing micro-scratch resistance (for example silicate nanoparticles composed of fumed silica).

In a particularly preferred embodiment, the wear layer comprises a first coat of a corundum-containing UV varnish, which is partly gelated by means of UV driers, a second coat of an EBC varnish as elastic intermediate coat, and a third coat of an EBC topcoat comprising nanoparticles.

The varnish layers are first partly cured, especially using an excimer source for the purpose of matting by formation of microcreases in the varnish surface, and the entire varnish structure is finally finish-cured or through-cured, especially using an EBC source.

In such cases, the amount applied for each individual protective layer or coat of a protective layer may vary between 10 $g/m^2$ and 100 $g/m^2$, preferably 20 $g/m^2$ and 80 $g/m^2$, especially preferably between 30 and 50 $g/m^2$, or be the same. The total amount applied, depending on the number of coats, may vary between 30 $g/m^2$ and 150 $g/m^2$, preferably 50 $g/m^2$ and 120 $g/m^2$.

It is also possible for the at least one antiwear layer to comprise chemical crosslinkers, for example based on isocyanates, which increases the intermediate adhesion of the individual antiwear layers arranged one on top of another.

The acrylate compounds used in the radiation-curable varnishes, because of their reactivity, are capable of adding onto or ensheathing the fibers, abrasion-resistant particles or additives present in the varnish. During the further processing of the wood-based material boards, there is chemical crosslinking of the reactive double bond of the acrylate compounds and hence formation of a polymer layer on the fibers, particles, color pigments or additives that counteracts bleaching.

As mentioned, the decorative film and the decorative finish film may be laminated onto the wood-based material board as a decorative layer, for example in a lamination press. In the case of lamination onto the wood-based material board, especially the top side of the wood-based material board, a suitable binder, for example a polyvinyl acetate (PVAc) glue, urea glue or PU hotmelt, is first applied to the top side. The amounts of (liquid) binder necessary are between 20 and 50 $g/m^2$, preferably 30 and 40 $g/m^2$. In the case of the use of PU hotmelt, the amounts applied are between 50 and 150 $g/m^2$, preferably between 70 and 100 $g/m^2$. The advance rate of the lamination line is preferably between 10 and 50 m/min, preferably 20 and 30 m/min. Because of the high temperatures that exist in the lamination press, in the case of the finish film, there is residual curing of the resin impregnate of the decorative paper of the finish film.

In yet a further embodiment of the present wood-based material board, the at least one decorative layer may comprise at least one amino resin-impregnated decorative paper ply and optionally at least one amino resin-impregnated overlay paper ply, in which case the decorative paper ply and optionally the overlay paper ply are compressed with the wood-based material board.

Decorative papers or decorative paper plies in turn are single-ply specialty papers for surface finishing of wood-based materials, which enable a high variety of decoration. Thus, as well as typical prints of various wood structures, more elaborate prints of geometric shapes or artistic products are obtainable. The choice of motif is in fact unlimited. In order to assure optimal printability, the paper used has to have good smoothness and dimensional stability, and likewise has to be suitable for penetration of any synthetic resin impregnation necessary. Preference is given to using impregnated decorative papers, for example with a heat-curable synthetic resin impregnation.

Frequently, the decorative paper is supplied together with a wear layer (overlay paper ply) as a single layer. Overlays used are thin papers which have typically already been impregnated with a melamine resin. Likewise obtainable are overlays in which abrasion-resistant particles, for example abrasion-resistant particles preferably selected from the group comprising aluminas, boron carbides, silicon dioxides, silicon carbides and glass particles, have already been mixed into the overlay resin, in order to increase the abrasion resistance of the laminate or the wood-based material board.

In another variant, the at least one decorative paper ply, after application to the top side of the wood-based material board, is compressed under the action of pressure and temperature (for example in a short-cycle press) (for example to form a laminate). In a further embodiment, a backing can be applied to the bottom side of the wood/polymer composite material board. This especially compensates for the tensile forces that act as a result of the decorative and overlay plies applied on the top side of the wood/polymer composite material board. In a preferred embodiment, the backing is executed in the form of an impregnated cellulose ply. For example, the backing may be executed as a paper impregnated with a heat-curable synthetic resin. In a particularly preferred embodiment, the layer structure of the backing corresponds to the layer structure and the respective layer thickness of the exact layer sequence composed of decorative and overlay plies applied on the top side.

In a preferred embodiment, the decorative paper and/or overlay paper plies and the backing are compressed with the wood/plastic composite material board of large size format in one operating step under the action of temperature and pressure in a short-cycle press to give a laminate.

Typical short-cycle presses work, for example, at a pressure of to 60 kg/cm², a temperature at the wood-based material surface of about 165-175° C., and a pressing time of 6 to 12 seconds.

In the case of use of the wood/polymer composite material boards according to the invention as base materials, the short-cycle presses preferably work at temperatures 30° C. to 40° C. lower than in the case of production of laminates based on conventional wood fiberboards. In a particularly preferred embodiment, the short-cycle presses, in the case of use of the wood/polymer composite material boards according to the invention, work at a temperature of 140° C. to 160° C. at the board surface, most preferably at 150° C. at the board surface.

The compression time in the short-cycle press in the case of use of the wood/polymer composite material boards according to the invention is 5 to 15 s, preferably 7 to 12 s, more preferably not more than 10 s, for example 9, 8, 7 or 6 seconds.

When compression times greater than 10 s are chosen in the production of laminates based on wood/polymer composite materials, chilling is necessary, in order that the structure of the wood/polymer composite material boards is not destroyed. This can be effected, for example, by chilling the boards directly at the press outlet by means of pre-chilled air. A further option is chilling by means of chilled rolls or in a press equipped for the purpose (chilling zone).

As already indicated above, it is also possible and viable in a further variant of the present process to apply the at least one decorative layer, especially in the form of a finish film or amino resin-impregnated decorative paper ply, to the top side of the pre-consolidated preliminary mat actually during the production process. In other words, the at least one finish film is applied here simultaneously to the top side of the preliminary mat for the purpose of further consolidation on transfer of the pre-consolidated preliminary mat from the first heat treatment oven into the at least one double belt press, such that the pre-consolidated preliminary mat is subsequently consolidated further together with the at least one finish film (in the double belt press). The finish film can be applied in a simple manner by supplying the finish film to the at least one double belt press by means of at least one unwinding apparatus.

It is also possible to apply a plurality of finish films, for example 2, 3, 4 or 5 films.

It is also conceivable that at least one separation ply is simultaneously applied above the finish film during the transfer of the pre-consolidated preliminary mat into the at least one double belt press.

It is also possible to provide the top sides of the wood-based material boards with an embossed structure. This preferably directly follows the application of the decorative layer to the wood-based material board or the preliminary mat.

Thus, during the further processing of the wood-based material board in the short-cycle press using a structured pressure plate, surface structures can be produced in at least one surface, preferably the top side of the wood-based material board, such as that of a wood/polymer composite material board, which may optionally be matched to the decoration (called a decoration-synchronous structure). Preferably, the surface structures are substantially congruent with the decoration. In this case, reference is made to embossed-in-register structures. In the case of wood decorations, the structures may be in the form of pore structures which follow the grain. In the case of tile decorations, the structures may be depressions in the region of joint-filling lines encompassed by the decoration.

In the coating of the board, however, the press temperatures must be reduced by 30-40° C. Like the lowering of the compression times below 10 seconds, this measure also serves to prevent unnecessary introduction of heat into the base board that would lead to unwanted plasticization and hence to deformation.

In the case of structuring of the surface of the preliminary mat, the following approaches are possible:
  a. use of an already structured finish film;
  b. use of a structuring paper which is entrained between the upper belt of the double belt press and the upper side of the preconsolidated preliminary mat; or
  c. embossing of a structure during the run through the double belt press by using an upper belt of the double belt press which in turn has a structure.

The structured finish film according to option a) may, for example, be a polymer film which itself has already been structured.

In a further configuration, it may also be the case that the wood-based material board in the form of a WPC has a profile at least in an edge region of the board, the profile enabling, for example, the introduction of a groove and/or tongue profile into an edge or side face of the wood-based material board, in which case the panels or wood-based material boards thus obtained can be joined to one another and enable laying and coverage of a floor in a floating manner.

By means of the present process, it is now possible to produce a wood-based material board, especially a wood/polymer composite material, comprising a mixture of wood particles and at least one polymer, especially a polymer functionalized with an organic compound, wherein the at least one organic compound has over at least one functional group for formation of a bond with the OH groups of the wood particles.

Owing to the high polymer content, the present wood-based material board has distinctly reduced swelling compared to standard HDF boards or even swelling-reduced HDF boards. In the coated state, in the edge swelling test according to DIN EN 13329, with high melamine strengthening of the glue used, the latter attain edge swelling values of about 7%. The fiberboard or WPC of the invention attains edge swelling of <3.5% in the coated state.

The present wood-based material board has a multitude of advantages: retention of the good mechanical properties, usability of standard technologies, for example lamination with known lamination presses and/or varnishing with known varnishing lines, optimal processibility of boards of large format size, and very low swelling of the base board and the finished floor.

The present wood-based material board, especially the wood/polymer composite material boards provided with appropriate decorations and wear layers, can be used as coverings for walls, floors or roofs or for furniture. The preferred field of use is the field of floor coverings and laminate floors.

The invention is elucidated in detail hereinafter with reference to the figures of the drawing with reference to several working examples. The figures show:

BRIEF DESCRIPTION OF THE DRAWINGS

FIG. 2 a schematic diagram of a second embodiment of the present process.

DETAILED DESCRIPTION OF THE INVENTION

Figure 1:
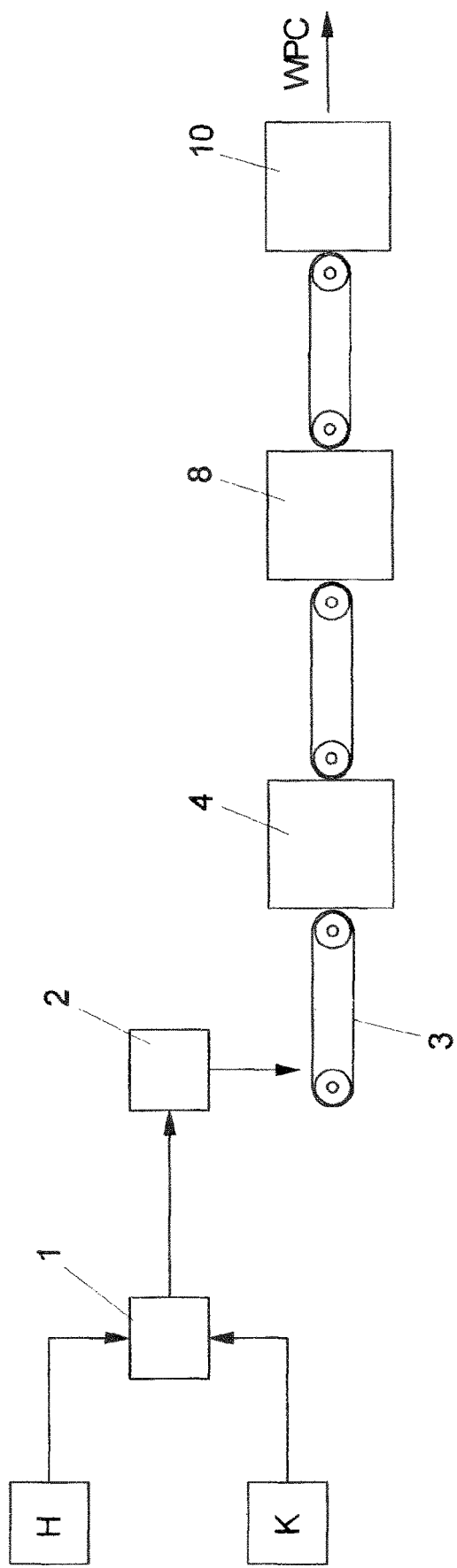
FIG. 1 a schematic diagram of a first embodiment of the present process.

The process flow diagram shown in FIG. 1 comprises a mixing apparatus 1, into which are introduced wood fibers H and polymer K, for example maleic anhydride-functionalized bicomponent fibers. The mixing apparatus 1 may take the form, for example, of a blow line in which the air blown in results in intensive mixing of the wood fibers and the functionalized bicomponent fibers.

From the mixing apparatus 1, the fiber mixture arrives in a scattering apparatus 2 from which the fiber mixture is mechanically discharged and scattered onto a transport belt 3 to form a preliminary mat. The scattering apparatus 2 may take the form, for example, of a roll-type scattering head. Below the transport belt may be arranged a balance, for example in the form of a belt balance, which continuously determines the weight of the preliminary mat.

The transport belt 3 introduces the preliminary mat into a heat treatment oven 4, for example in the form of a conveyor oven with an advance rate of up to 15 m/min. In the heat treatment oven, preliminary consolidation of the preliminary mat proceeds at temperatures of up to 200° C., with partial melting of the bicomponent fibers, bringing about bonding of the bicomponent fibers with the wood fibers. The thickness of the preliminary mat that leaves the heat treatment oven may be between 20 and 100 mm.

After leaving the heat treatment oven 4, the pre-consolidated preliminary mat is introduced directly into a double belt press 5 with an advance rate of up to 12 m/min. In the double belt press 5, there is further consolidation of the mat or preliminary mat at a pressure of, for example, 3 MPa and a temperature of, for example, 220° to a thickness between 2 and 15 mm.

After the partial melting of the bicomponent fibers, the state of consolidation of the board leaving the double belt press 8 has to be kept constant until the bicomponent fibers have cooled to such an extent that the temperature has reliably gone below the softening temperature thereof, in order to prevent the consolidated board from "coming apart" by virtue of the reset forces of the bicomponent fibers. For this purpose, the consolidated board leaving the double belt press 8 is introduced directly into a chill press 10 in which the consolidated board is chilled to temperatures between 15 and 40° C. The chill press can be cooled, for example, by means of water cooling. The heating and cooling segments can also be integrated jointly into the double belt press and connected to one another via a shared transport belt.

After leaving the chill press 10, the consolidated (WPC) board has a thickness between 2 and 12 mm and an apparent density of, for example, 800 to 1100 kg/m$^3$. The WPC board can subsequently be processed further as desired (for example application of decorative layers) and finished.

The process flow diagram shown in FIG. 2 differs from the flow diagram of FIG. 1 in that, after leaving the heat treatment oven 4, the pre-consolidated preliminary mat is introduced directly into a double belt press 8 with an advance rate of up to 12 m/min, with simultaneous application of a decorative finish film to the top side of the preliminary mat by means of the unwinding apparatus 5 and of a backing paper to the bottom side of the preliminary mat by means of the unwinding apparatus 7. As required, after application of the decorative finish film with the unwinding apparatus 5, a release paper or a release film can also be applied with the unwinding apparatus 6. In the double belt press 8, the mat or preliminary mat is consolidated further to a thickness between 2 and 15 mm, for example to 4.5 mm at a pressure of, for example, 3 MPa and a temperature of, for example, 160°.

Working Example 1a: Production of a First WPC Base Board

Bale openers were used to provide wood fibers (44 wt %) and a mixture of bicomponent fibers (55 wt %, polyethylene terephthalate/polyethylene terephthalate-co-isophthalate) and 1 wt % of LLDPE fibers grafted with maleic anhydride, which were fed to a blow line as mixing apparatus to form a wood fiber/polymer fiber mixture. The wood fiber/polymer fiber mixture is intermediately stored in a feeder.

Subsequently, the wood fiber/polymer fiber mixture is blown onto a first roll to form a first preliminary mat (airlay), the first preliminary mat is defiberized and the defiberized mixture is blown once again onto a further second roll to form a second preliminary mat (airlay).

The second preliminary mat (basis weight: 4200 g/m$^2$) is laid onto a conveyor belt in a width of 2800 mm. The advance rate of the conveyor belt was about 6 m/min.

The preliminary mat was pre-consolidated in a conveyor oven at temperatures of up to 160° C. to a thickness of 35 mm to give a mat by thermal bonding. The mat here reached a core temperature of about 130° C.

The mat (size format: 2650×2150 mm, thickness: 35 mm, basis weight: 3100 g/m$^2$) is consolidated in a double belt press at about 220° C. and 50 bar to about 4 mm. Subsequently, the mat consolidated to a board is chilled to about 50° C. in a chilled continuous press. The boards are trimmed (size format: 2600×2070 mm; thickness about 4 mm) and polished.

Working Example 1b: Production of a Second WPC Base Board

In analogy to working example 1a, the mat (pre-consolidated mat) is produced by mixing the fibers and forming a preliminary mat with subsequent thermal bonding to form a mat, in which bonding points form between the heated polymer and wood fibers.

The ratio of polymer fibers to wood fibers is 56%:44%. The polymer fibers are bicomponent fibers composed of PE/PP grafted with maleic anhydride. The maleic anhydride serves as a coupler to the OH groups of the cellulose of the wood fibers.

The mat (size format: 2650×2150 mm, thickness: 35 mm, basis weight: 3100 g/m$^2$) is consolidated here in a double belt press at about 220° C. and 50 bar to about 4 mm. Subsequently, the consolidated mat is chilled to about 50° C. in a chilled continuous press. The boards are trimmed (size format: 2600×2070 mm; thickness about 4 mm) and polished.

Working Example 2: WPC with Decorative Film Applied by Lamination

The WPC size formats of working example 1a, after cooling, were bonded to a decorative polypropylene film for floor applications on the top side and to a backing based on a glued paper on the reverse side. The bonding is effected with a PU hotmelt. The amounts of the adhesive applied are 100 g/m$^2$ on the top side and 50 g/m$^2$ on the bottom side.

The abovementioned size formats were used to produce floorboards equipped with connecting profiles of the tongue and groove type on the side faces. The panels thus obtained are suitable for covering a floor and are laid in a floating manner.

Working Example 3: WPC with Decorative Paper Ply (Finish Film) Applied by Lamination and Given an Abrasion-Resistant Varnish Seal The WPC base board produced in working example 1b is coated in a lamination press with a decorative, resin-filled and surface-varnished paper. A backing (paper) is laminated onto the bottom side. For the lamination, a PVAc glue is used, which is applied in liquid form on either side in an amount of about 30 g/m$^2$. The advance rate at the lamination line is about 20 m/min. The temperature in the thermal oil is about 200° C.

The decorated side of the board (size format 1300× 1300×4 mm) is varnished with several applications of varnish in a varnishing line. First of all, a corundum-filled UV basecoat is applied (amount applied about 80 g/m$^2$). The latter is partly gelated with a UV source. Thereafter, an elastic intermediate varnish, an EBC varnish, is applied (amount applied about 50 g/m$^2$). The latter is partly cured with an electron beam source. Subsequently, an EBC topcoat is applied, provided with nanoparticles to enhance microscratch resistance (amount applied about 20 g/m$^2$). This varnish is first partly surface cured with an excimer source (this is done for the purpose of matting by formation of microcreases in the varnish surface) and then the entire varnish structure is subjected to final curing, in the sense of through-curing, with an EBC emitter.

The plates of large size format, after a rest period of about two days, are used to produce panels on a flooring line, these having been equipped with connecting profiles on the side faces that are suitable for glue-free connection and interlocking of such panels to give a floor covering laid in a floating manner.

Working Example 4: WPC with Paper Ply (Finish Film) Applied by Direct Lamination to the Pre-Consolidated Mat In analogy to working example 1a, preliminary mats or fiber cake blanks consisting of 54 wt % of polymer fibers (27 wt % of PE fibers, 25 wt % of PET bicomponent fibers and 2 wt % of LLDPE fibers grafted with maleic anhydride), 44 wt % of wood and 2 wt % of paraffin, with a basis weight of 3150 g/m$^2$, a thickness of 35 mm and a size format of 1300×1400 mm are placed onto a transport belt of a double belt press. The double belt press had a heating zone having a length of three meters and a cooling zone having a length of six meters.

A decorative finish film which had been varnished on the top side with a corundum-containing, radiation-curing varnish was placed onto the fiber cake from above by means of an unwinding apparatus. The weight of the varnished paper was about 200 g/m$^2$. A second unwinding apparatus was used to apply a release paper to the decorative film. A backing paper (gram weight: 80 g/m$^2$) was supplied to the bottom side of the fiber cake by means of an unwinding apparatus.

The fiber cake then entered the double belt press and was compressed to a thickness of 4.5 mm at an advance rate of 2 m/min, a pressure of 30 bar and a temperature of the upper and lower steel belt of 160° C. An accompanying thermocouple was used to determine the temperature in the middle of the fiber cake. It was 140° C. at the end.

Beyond the press, the release paper was wound up. The decorative paper and the backing paper had been pressed in a homogeneous and fold-free manner onto the WPC (=wood plastic composite) board that had formed during the pressing operation. In the cross-cut test, it was possible to peel off the decorative paper on the reverse side only with all the fibers attached, which suggests a very good bond between the film and WPC board.

Working Example 5: Laminate Formed from WPC

A WPC board (5 mm, apparent density: 850 kg/m$^2$, ratio of polymer to wood fibers 56% to 44%) produced, for example, according to working examples 1a, b, is coated in a short-cycle press with a structure which is typically used for a laminate floor. This was as follows:
  top side
    overlay with melamine resin impregnation (corundum-filled),
    decorative paper with melamine resin impregnation
  bottom side
    backing with melamine resin impregnation The impregnated papers were the standard products in terms of resin application, VC (=content of volatile constituents) and the reactivity. The coating was executed at about 150° C. (product temperature), 40 bar and compression time 9 seconds. Subsequently, the coated board was cooled and, after a defined storage time, divided on a flooring line to give boards with a glue-free connection profile. Boards were taken from the production and subjected to an edge swell test according to DIN EN 13329. In this test, after a test duration of 24 h, edge swelling of 2.5% was found. After redrying at room temperature, this declined to 0.5%.

The invention claimed is:

1. A floor panel made from a wood-based material board, producible from a mixture of wood fibers and polymer fibers, comprising:
    wood fibers having a length of 1.0 mm to 10 mm and polymer fibers, wherein the polymer fibers have been functionalized with at least one organic compound,
    wherein the mixing ratio of wood fibers and polymer fibers is between 70% by weight of wood fibers/30% by weight of polymer fibers and 40% by weight of wood fibers/60% by weight of polymer fibers,
    wherein at least one decorative layer has been provided on at least one side of the wood-based material board, and
    wherein the at least one decorative layer comprises at least one decorative film consisting of at least one thermoplastic carrier layer comprising polyethylene, polypropylene, or polyurethane, of at least one decoration printed onto the carrier layer, and at least one polymer seal comprising a polypropylene film or a polyurethane film.

2. The floor panel of claim 1, wherein the decorative film has been laminated onto the wood-based material board using at least one adhesive.

3. The floor panel made of claim 1, wherein the decorative film, during the process for producing the wood-based material board, is placed onto a pre-consolidated mat and subjected to further consolidation together with the pre-consolidated mat to give the wood-based material board.

4. The floor panel of claim 1, wherein the polymer fibers comprises a thermoplastic polymer, selected from the group consisting of polyethylene (PE), polypropylene (PP), polyesters and mixtures thereof.

5. The floor panel of claim 4, wherein the polyester is polyethylene terephthalate.

6. The floor panel of claim 4, wherein the polymer fibers comprise polypropylene (PP) and polyethylene (PE).

7. The floor panel of claim 1, wherein the at least one organic compound has at least one functional group, where the functional group is selected from the group consisting of —$CO_2H$, —$CONH_2$, —COO—, maleic acid, phthalic acid, succinic acid, glutaric acid, adipic acid or the anhydrides thereof, succinimide.

8. The floor panel of claim 1, wherein the at least one organic compound is present in the polymer fibers in an amount between 0.1% and 5% by weight.

9. The floor panel of claim 8, wherein the at least one organic compound is present in the polymer fibers in an amount between 0.5 and 3% by weight.

10. The floor panel of claim 8, wherein the at least one organic compound is present in the polymer fibers in an amount between 1 and 2% by weight.

11. The floor panel of claim 1, wherein an at least one backing paper has been applied on at least one side.

12. The floor panel of claim 11, wherein an at least one backing paper has been applied on the opposite side from the decorative layer.

13. The floor panel of claim 1, wherein profiling has been provided on an edge region of the panel for introduction of a groove profile and/or tongue profile into an edge of the panel.

14. The floor panel of claim 1, wherein the floor panel has a thickness between 2 and 15 mm and an apparent density between 500 and 1500 kg/m$^3$.

15. The floor panel of claim 14, wherein the floor panel has a thickness between 3 and 12 mm and an apparent density between 650 and 1300 kg/m$^3$.

16. The floor panel of claim 14, wherein the floor panel has a thickness between 4 and 10 mm and an apparent density between 800 and 1100 kg/m$^3$.

17. The floor panel of claim 1, used as a floor panel for a laminate floor.

18. A process for producing a wood-based material board, comprising the steps of:
applying a mixture of wood fibers having a wood fiber moisture content between 6% and 15% and a polymer functionalized with at least one organic compound, in a mixing ratio between 70% by weight of wood fibers/30% by weight of polymer and 40% by weight of wood fibers/60% by weight of polymer, to a first transport belt to form a preliminary mat and introducing the preliminary mat into at least one first heat treatment oven for pre-consolidation;
transferring the pre-consolidated mat into at least one double belt press for further consolidation to a wood-based material board; and
chilling the consolidated wood-based material board in at least one chill press to temperatures between 10° C. and 70° C. wherein at least one decorative layer has been provided on at least one side of the wood-based board material, and wherein the at least one decorative layer comprises at least one decorative film consisting of at least one thermoplastic carrier layer comprising polyethylene, polypropylene, or polyurethane, of at least one decoration printed onto the carrier layer, and at least one polymer seal comprising a polypropylene film or a polyurethane film.

\* \* \* \* \*